United States Patent [19]

Baron

[11] Patent Number: 4,520,847

[45] Date of Patent: Jun. 4, 1985

[54] FLUID FLOW DIVERTER DISC VALVE

[75] Inventor: Walter J. Baron, Milwaukee, Wis.

[73] Assignee: Water Services of America, Inc., Milwaukee, Wis.

[21] Appl. No.: 527,691

[22] Filed: Aug. 30, 1983

[51] Int. Cl.³ .................... F16K 11/083; F16K 5/02
[52] U.S. Cl. .................... 137/625.43; 137/625.22; 137/625.47
[58] Field of Search .................... 137/625.43, 625.46, 137/625.21, 625.22, 625.23, 625.24, 625.47

[56] References Cited

U.S. PATENT DOCUMENTS

| 156,008 | 11/1874 | Wakefield | 137/625.22 |
| 660,010 | 10/1900 | Ezell | |
| 925,692 | 6/1909 | Gold | |
| 1,339,284 | 5/1920 | Petry | |
| 3,191,628 | 6/1965 | Kirkwood | 137/625.43 |
| 3,319,710 | 5/1967 | Heeren et al. | |
| 3,973,592 | 8/1976 | Cleaver et al. | |

FOREIGN PATENT DOCUMENTS 0077880  5/1983  European Pat. Off.
335111   9/1930  United Kingdom.

Primary Examiner—Martin P. Schwadron
Assistant Examiner—John S. Starsiak, Jr.
Attorney, Agent, or Firm—Andrus, Sceales, Starke & Sawall

[57] ABSTRACT

A longitudinally extending housing (21) is provided with a generally cylindrical side wall (22) closed by opposed end walls (23,24). The housing side wall is ported, to connect with supply and return lines (17,18) from a source of pressurized fluid (15), and also to connect with the input and discharge lines (19,20) of a process loop. The housing contains a longitudinally extending rotary axle (33) which forms a part of a valve rotator assembly (42). The assembly includes a plurality of segmental discs (43-46) mounted for rotation with the axle. Axially aligned alternate disc edges are joined by radial longitudinally extending partitions (52,53) to form a plurality of alternating axially oppositely facing rotary chambers (I-IV) adapted to communicate with the housing ports. Two diametrically opposed chambers (II,IV) are of generally equal arcuate extent and size, while the other diametrically opposed chambers (I,III) are of differing arcuate extent and size with one chamber (III) being of substantially lesser arcuate extent than the other (I). Fluid flowing through the housing between ports is always directed across the disc faces parallel to the spaced planes, and flows through the housing generally diametrically. The entire perimeter of the valve rotator assembly is sealed to the circumferential housing side wall by seals (60,61) extending along the arcuate disc edges. In a second embodiment, longitudinal seals (62) are additionally disposed along the outer longitudinal edges of the partitions.

7 Claims, 14 Drawing Figures

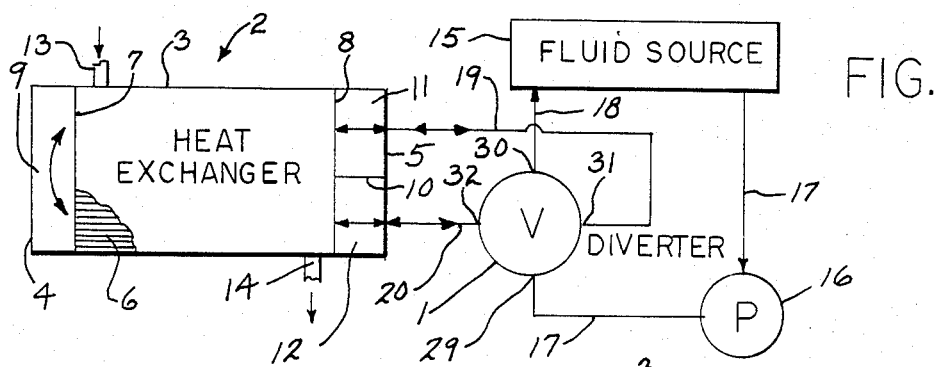
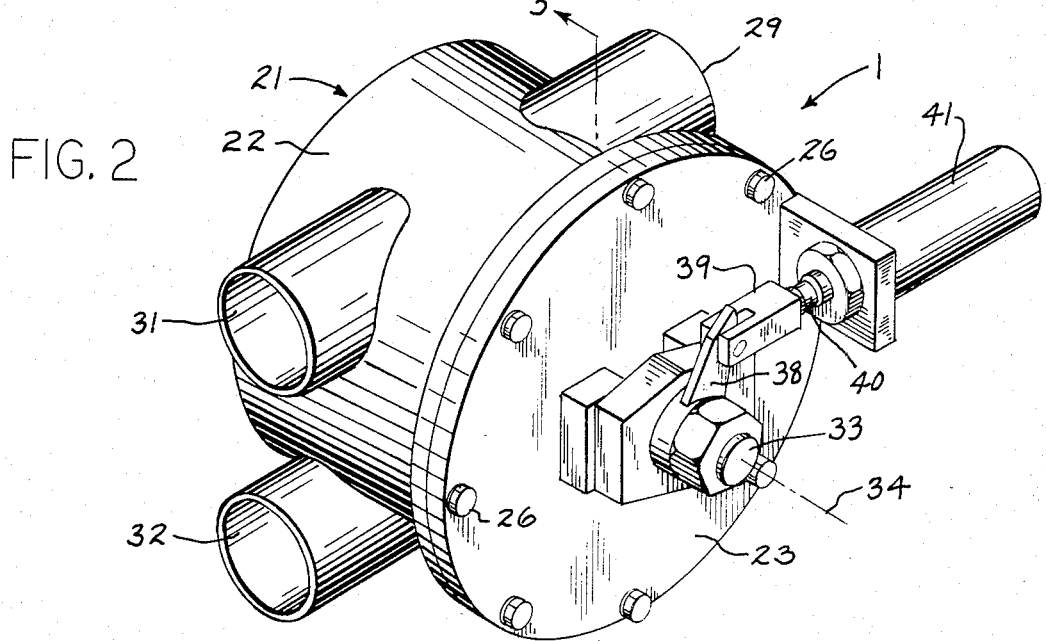
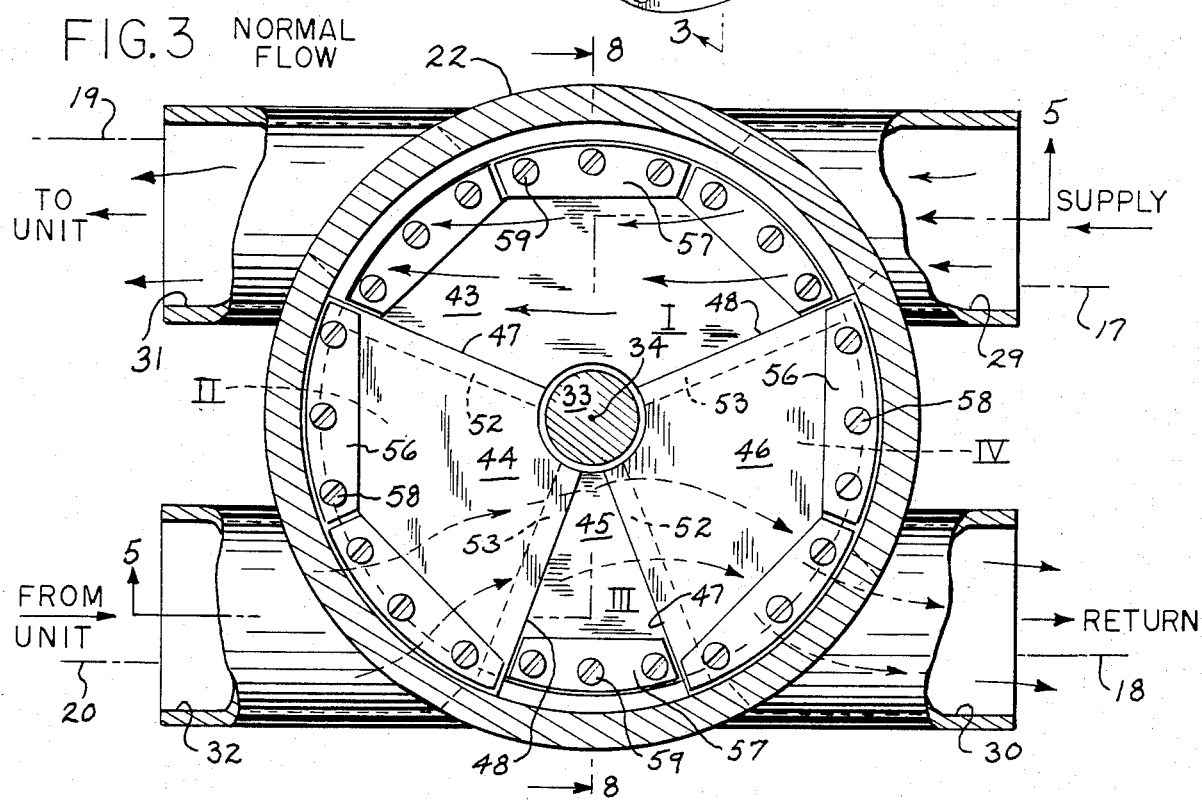

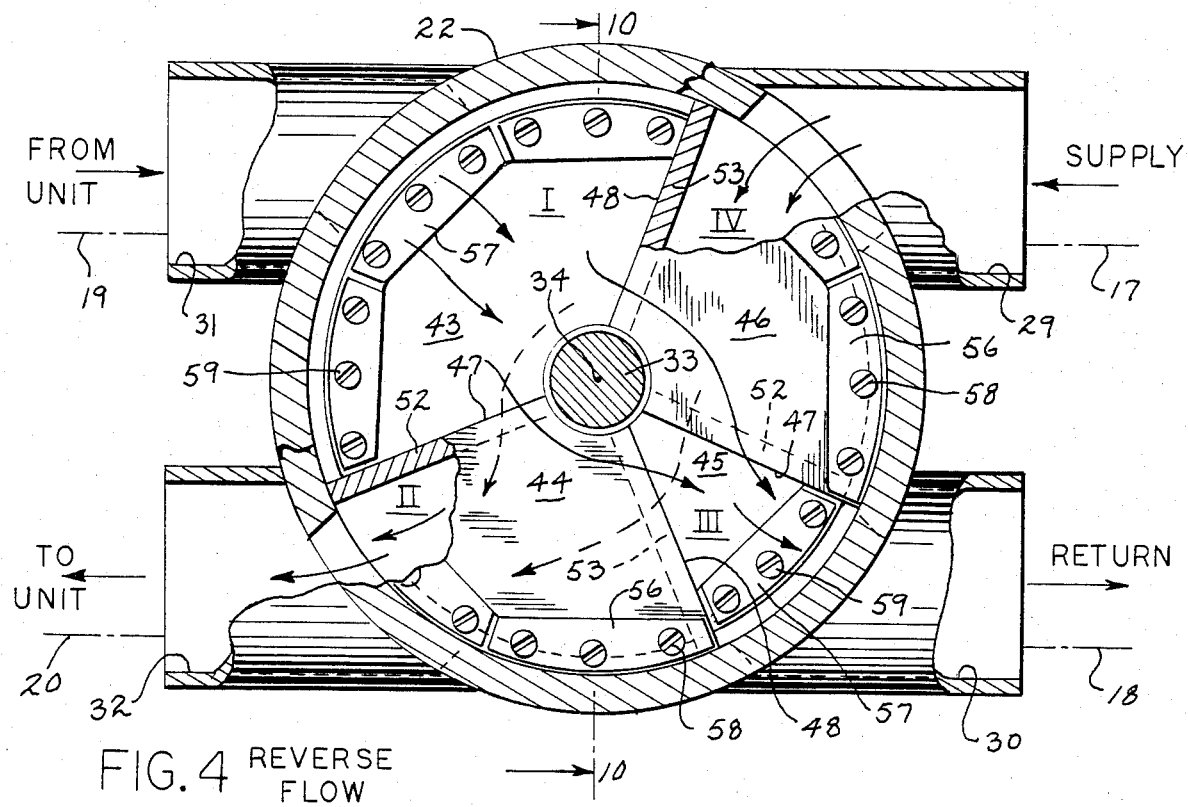
FIG. 4 REVERSE FLOW
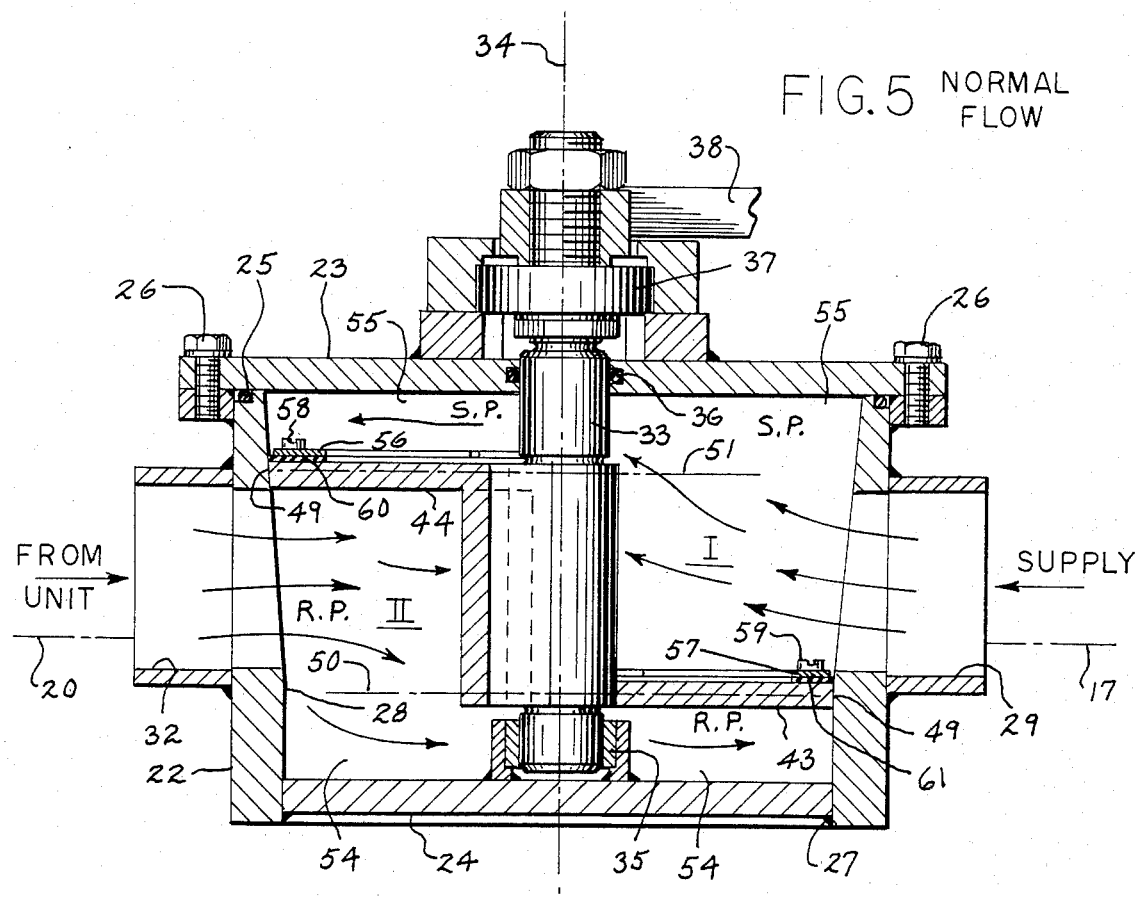
FIG. 5 NORMAL FLOW

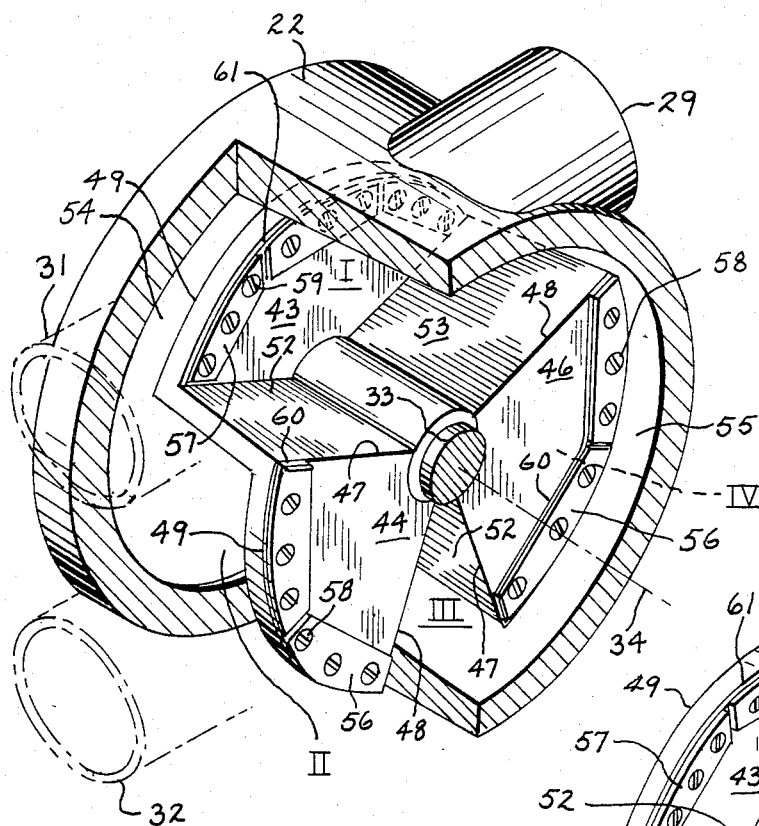
FIG. 6
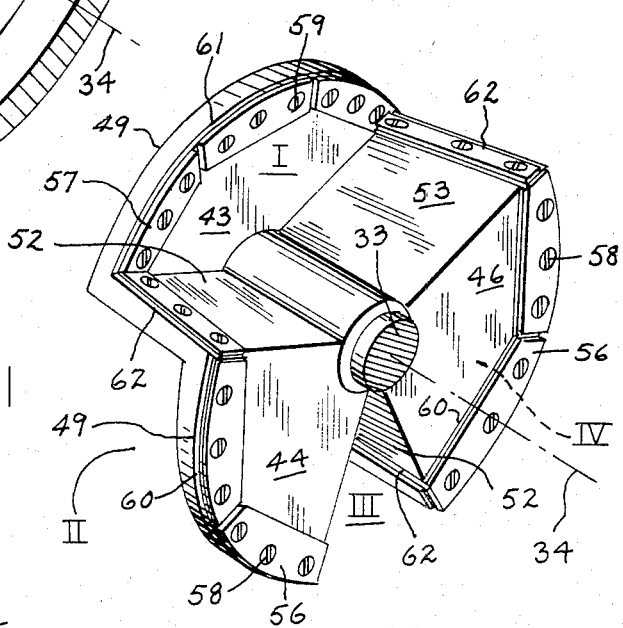
FIG. 11
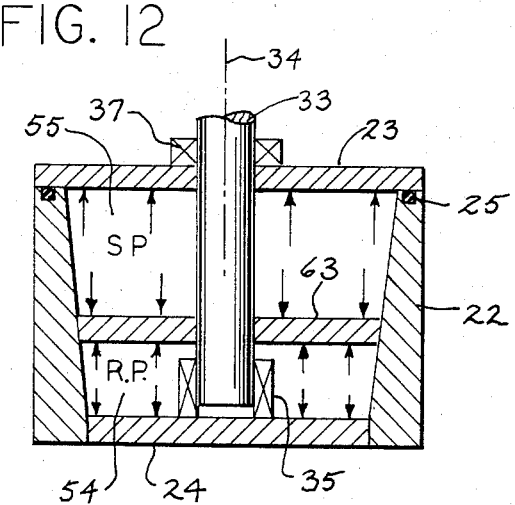
FIG. 12
FIG. 13
(PRIOR ART)
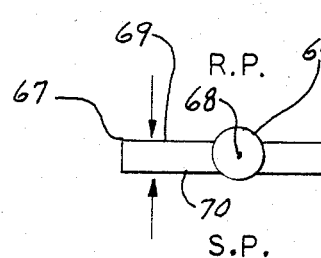
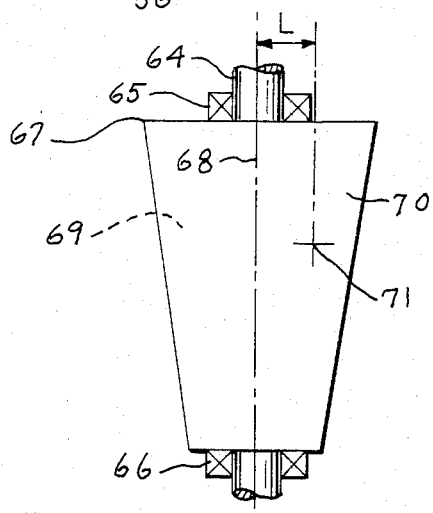
FIG. 14
(PRIOR ART)

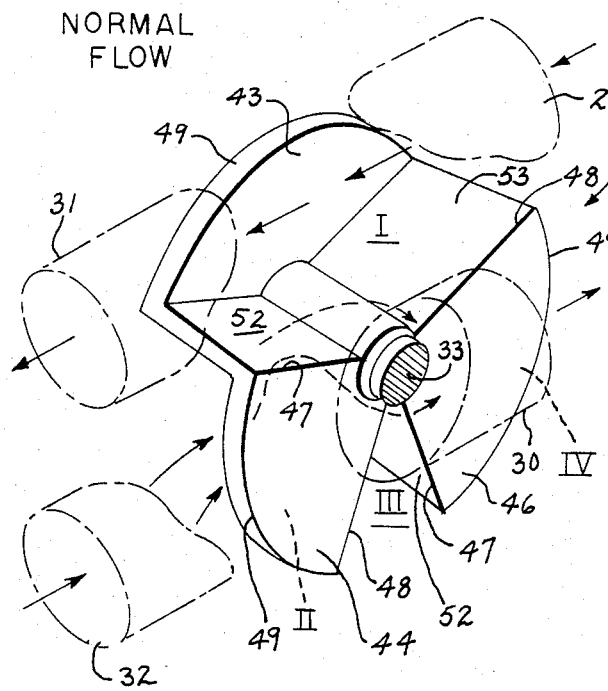
FIG. 7 NORMAL FLOW
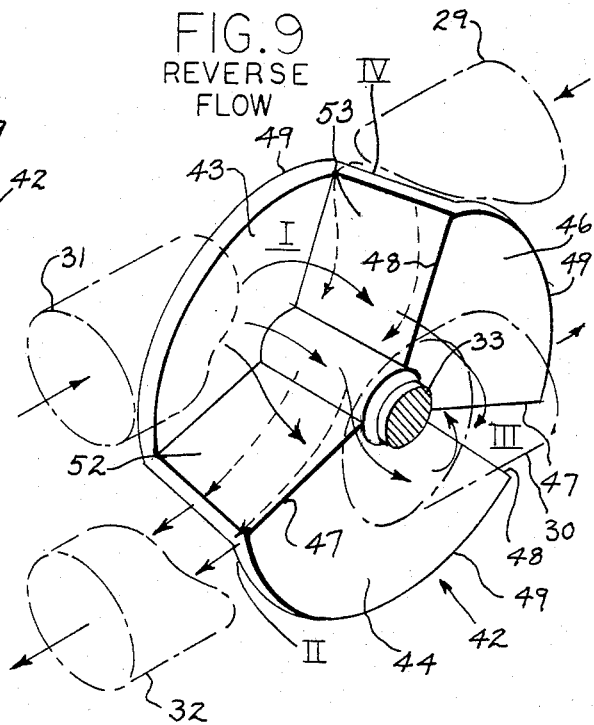
FIG. 9 REVERSE FLOW
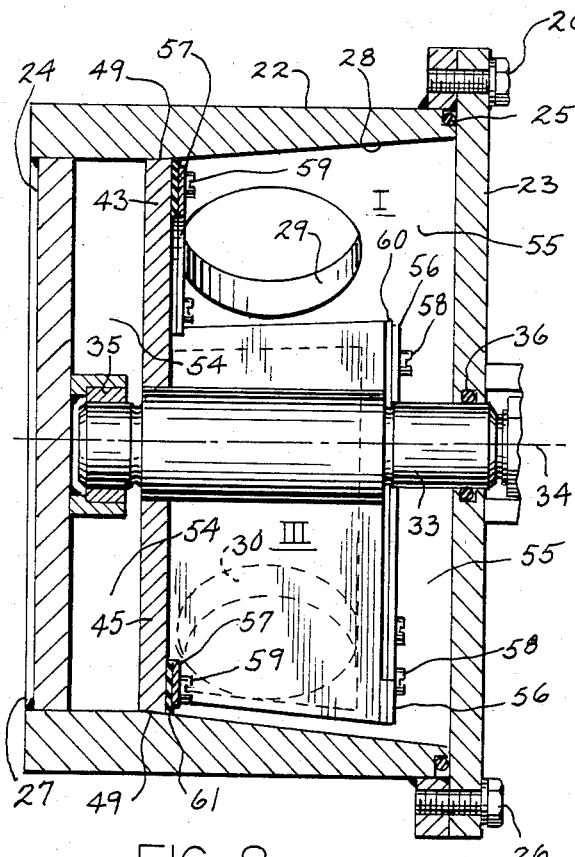
FIG. 8 NORMAL FLOW
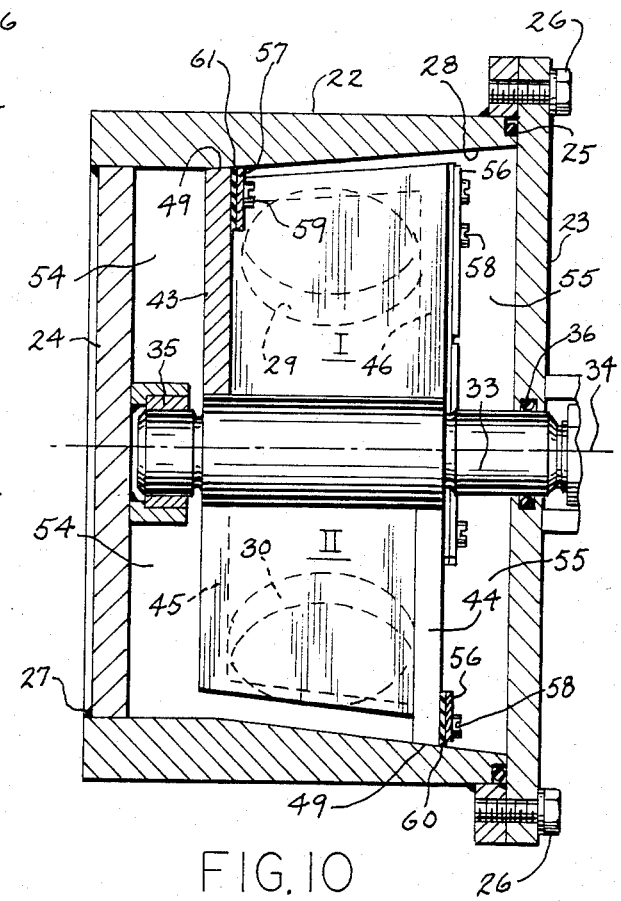
FIG. 10 REVERSE FLOW

FLUID FLOW DIVERTER DISC VALVE

U.S. PRIOR ART OF INTEREST

| U.S. Pat. No. | Inventor | Issued |
| --- | --- | --- |
| 660,010 | Ezell | Oct. 16, 1900 |
| 925,692 | Gold | Jun. 22, 1909 |
| 1,339,284 | Petry | May. 4, 1920 |
| 3,319,710 | Heeren et al. | May. 16, 1967 |
| 3,973,592 | Cleaver et al. | Aug. 10, 1976 |

BACKGROUND AND SUMMARY OF THE INVENTION

This invention relates to a fluid flow diverter disc valve, particularly for use in the cleaning of tubing of heat exchangers.

It has previously been suggested that heat exchanger tubing may be internally cleaned by disposing brush-basket devices at the ends of the tubes, and then by flowing fluid first in one direction and then the other to cause the brushes to traverse the length of the tubes and then return to their original positions. See the above-identified U.S. Pat. No. 3,319,710.

It has also been previously suggested as in the above-identified U.S. Pat. No. 3,973,592 to utilize a four-way valve for purposes of reversing fluid flow within the tubes to cause the cleaning brushes to move in both directions within the tubes. U.S. Pat. No. 3,973,592 reduces or eliminates external piping and utilizes a series of fixed fluid flow chambers in combination with a butterfly type plug valve having a rotatable vane for directing the fluid through the chambers. This construction is rather complex and results in side thrust on the vane support bearings as well as requiring relatively high vane turning torque. There is also a fair amount of pressure drop through the valve and at least some penetration of high (or supply) pressure fluid into the area of low (or return) pressure.

The above U.S. Pat. Nos. 660,011, 925,692 and 1,339,284 disclose various types of rotary valves of interest. The construction of U.S. Pat. No. 660,011, due to the fact that the flowing fluid makes a number of U-turns within the valve which causes high velocity pressure, is subject to high turning torque and a substantial pressure drop through the valve. In U.S. Pat. Nos. 925,692 and 1,339,284, the flowing fluid is directed through the end members of the rotary unit, thus creating a high turning torque.

It is an object of the present invention to provide an improved 4-way fluid flow reversal valve of the type which eliminates external piping, and wherein side thrust on the rotary bearings and turning torque are reduced to a minimum.

It is a further object of the present invention to reduce the pressure drop through the valve to a minimum.

It is yet another object of the present invention to maximize sealing between the rotary and fixed parts to retard fluid under high pressure from penetrating into the area of low fluid pressure.

It is an additional object of the present invention to provide a 4-way valve which is relatively inexpensive and easy to manufacture, install operate and maintain.

In accordance with the various aspects of the present invention, a longitudinally extending housing is provided with a generally cylindrical side wall closed by opposed end walls. The housing side wall is ported, to connect with supply and return lines from a source of pressurized fluid, and also to connect with the input and discharge lines of a process loop. The housing contains a longitudinally extending rotary axle which forms a part of a valve rotator assembly adapted to be angularly positioned between a normal fluid flow position and a reverse flow position.

The valve rotator assembly includes a plurality of segmental arcuate pie-shaped portless discs mounted for rotation with the axle. The discs extend radially outwardly from the axle, and transversely to the axis defined thereby, and terminate closely adjacent the housing side wall. The discs are disposed alternately adjacent opposite ends of the axle, but spaced from their adjacent housing side wall. Axially aligned alternate disc edges are joined by radial longitudinally extending partitions to form a plurality of alternately axially oppositely facing rotary chambers adapted to communicate with the housing ports. Each chamber is delineated by a disc and two partitions, as well as the housing side wall, with the end of the chamber opposite the disc being open into the housing chamber.

The two pair of diametrically opposed discs form a pair of axially spaced transverse planes which are disposed adjacent but spaced from their respective housing end walls. The housing ports are confined between the planes. Due to the open chamber ends, diametrically opposed chambers are always connected through their said open ends via the housing chamber.

In the present embodiment, two diametrically opposed chambers are of generally equal arcuate extent and size, while the other diametrically opposed chambers are of differing arcuate extent and size with one chamber being of substantially lesser arcuate extent than the other. When the valve rotator assembly is in normal position, the lesser sized chamber is blocked and the diametrically opposed larger chamber registers with two ports. In the reverse position of the valve rotator assembly, the lesser size chamber and its diametrically opposed larger chamber each register with a single port. In both assembly positions, the diametrically opposed generally equal sized chambers each register with one port.

The construction provides that fluid flowing through the housing between ports is always directed across the disc faces parallel to the spaced planes, and flows through the housing generally diametrically.

The entire perimeter of the valve rotator assembly is sealed to the circumferential housing side wall by seals extending along the arcuate disc edges. These seals are positioned in the spaced planes with the housing ports disposed between the planes so that the seals fully engage the housing side wall at all times. In a second embodiment, longitudinal seals are additionally disposed along the outer longitudinal edges of the partitions.

BRIEF DESCRIPTION OF THE DRAWINGS

The accompanying drawings illustrate the best mode presently contemplated by the inventor for carrying out the invention.

In the drawings:

FIG. 1 is a schematic showing of a heat exchange system to which the fluid flow diverter disc valve of the present invention may be applied;

FIG. 2 is a perspective view of the diverter valve of the present invention;

FIG. 3 is a vertical section taken on line 3—3 of FIG. 2, with the valve rotator assembly in normal flow position;

FIG. 4 is a view similar to FIG. 3 with the assembly in reverse flow position;

FIG. 5 is a section of the valve taken on line 5—5 of FIG. 3;

FIG. 6 is a perspective view of the valve with part of the housing broken away for purposes of clarity;

FIG. 7 is a schematic showing of the fluid flow paths with the rotator assembly in normal flow position;

FIG. 8 is a section taken on line 8—8 of FIG. 3;

FIG. 9 is a view similar to FIG. 7 with the rotator assembly in reverse flow position;

FIG. 10 is a section taken on line 10—10 of FIG. 4;

FIG. 11 is a perspective view of a second embodiment of valve rotator assembly;

FIG. 12 is a schematic showing of the forces involved with a rotary valve wherein fluid impinges on a transverse member;

FIG. 13 is a schematic top view showing the forces involved with fluid impinging on a rotary axial plug; and FIG. 14 is a side view of the plug of FIG. 13.

DESCRIPTION OF THE PREFERRED EMBODIMENT

The fluid flow diverter disc valve 1 of the invention is shown schematically in FIG. 1 and may be utilized in connection with a process device such as a heat exchanger 2 having a cylindrical housing 3 with end closure heads 4 and 5, and a plurality of longitudinally extending tubes 6 therein. The exposed open ends of tubes 6 are connected to circular transverse tube sheets 7 and 8 which are spaced from the respective head ends 4 and 5. Head 4 and tube sheet 7 form one fluid flow chamber 9 while a partition 10 separates the space between head 5 and tube sheet 8 into a pair of fluid flow chambers 11 and 12. Heat exchanging fluid is introduced through an inlet 13 to the area around tubes 6 and discharges through an outlet 14.

Valve 1 normally supplies cooling water from a fluid source 15 and flow thereof is continuously generated by a pump 16. The valve is connected to pump 16 and source 15 through a suitable fluid supply line 17, and also to source 15 by a suitable return line 18. A pair of lines 19 and 20 connect valve 1 to heat exchanger 2 in the conventional manner. Valve 1 is actuatable to reverse the flow in lines 19 and 20 so that tube cleaning brushes, not shown, can shuttle back and forth in tubes 6 from time to time.

As best shown in FIGS. 2-5, the fluid flow diverter disc valve 1 of the present invention comprises a housing 21 including a cylindrical side wall 22 enclosed by end walls 23 and 24. End wall 23 is shown as a closure sealed to one end of housing side wall 22 by an O-ring 25 and removably secured thereto as by bolts 26. End wall 24 is shown as recessed slightly within the other end of housing side wall 22 and sealingly secured thereto as by an annular weld 27. In the present embodiment, and as best shown in FIGS. 5 and 8, the inner face 28 of side wall 22 is longitudinally straight adjacent end wall 24, but then tapers outwardly as it approaches end wall 23.

Cylindrical wall 22 of housing 21 is provided with a pair of spaced parallel ports 29 and 30 which are upstream in the loop formed with lines 17 and 18. Ports 29 and 30 always function as supply and return ports respectively when valve 1 is connected as shown. Likewise, wall 22 also includes a pair of spaced parallel ports 31 and 32 which are downstream in the loop formed with lines 19 and 20. As shown, ports 29 and 31 are in line, as are ports 30 and 32.

A longitudinal rotary axle 33 defining an axis of rotation 34 is centrally disposed in valve housing 21. As best shown in FIGS. 2 and 5, one end of axle 33 is rotatably mounted in a radial sleeve bearing 35 which is suitably secured to the inner face of end wall 24. The other end portion of axle 33 extends through end wall 23 (with an O-ring seal 36) and is journalled for rotation in a radial thrust bearing 37 mounted to the outer face of wall 23. Axle 33 extends beyond bearing 37 and is connected to means for rotating the axle through a suitable arc, such as 45°. In the present embodiment, this means comprises a lever arm 38 which joins axle 33 with a clevis 39 mounted on the outer end of the reciprocable piston 40 of a fluid cylinder 41, which may be actuated in any suitable well-known manner.

Axle 33 forms part of a valve rotator assembly 42 (see FIGS. 7 and 9) wherein fluid entering supply port 29 may be selectively directed to either downstream port 31 or 32, and wherein fluid returning through either one of the downstreram ports is discharged through return port 30.

For this purpose, the valve rotator assembly 42 includes a plurality of segmental arcuate pie-shaped portless discs 43, 44, 45, 46 which are mounted to rotate with axle 33. Each of the discs extends radially outwardly from axle 33 and is disposed transversely thereto and to axis 34. Each disc includes a pair of arcuately shaped generally radial edges 47, 48 joined at their outer ends by an arcuate edge 49 which is disposed very closely adjacent the inner surface of housing side wall 22. Discs 43 and 45 are somewhat shorter in radius than discs 44 and 46, due to the aforementioned internal taper of housing side wall 22.

Discs 43-46 are disposed alternately adjacent opposite end portions of axle 33. Thus, discs 43 and 45 are at one axle end portion and define a first transverse plane 50, while discs 44 and 46 are at the opposite end portion of axle 33 and define a second transverse plane 51 axially spaced from plane 50.

Axially aligned alternate disc edges 47, 48 are joined by longitudinally extending partitions 52, 53 which are mounted to extend radially from axle 33 to the ends of the arcuate edges 49. Thus, transverse disc 43 is joined to axially spaced discs 44 and 46 by partitions 52 and 53, with similar partitions joining disc 45 to discs 44 and 46.

The resultant zig-zag pattern of discs and partitions produces a plurality of circumferentially spaced rotatable diverter chambers, designated in the drawings by Roman numerals I, II, III, and IV. In addition, the configuration of valve rotator assembly 42, with planes 50 and 51 spaced inwardly from the respective housing end walls 24 and 23, creates a pair of separate housing chambers 54 and 55.

The open outer portion of each diverter chamber I through IV is closed by housing side wall 22. One end wall of each alternate diverter chamber is delineated by alternately axially positioned discs, with the opposite end of each diverter chamber being open. Furthermore, partitions 52 and 53 define side walls of each respective diverter chamber.

Thus, diverter chamber I is formed by housing side wall 22, disc 43 and partitions 52 and 53 (connected to discs 44 and 46). The end of diverter chamber I opposite disc 43 opens into and forms a part of housing chamber 55, as best shown in FIG. 8. Likewise, diverter chamber II is formed by housing side wall 22, disc 44 and partitions 52 and 53 (connected to discs 43 and 45). The end of diverter chamber II opposite disc 44 opens into and forms a part of housing chamber 54. The arrangement is similar for alternating diverter chambers III and IV.

Chambers I through IV selectively communicate through their open outer portions with ports 29 through 32. In addition, ports 29-32 are all positioned so that they are disposed between planes 50 and 51.

The entire perimeter of valve rotator assembly 42 is sealed to the housing side wall 22 to retard penetration of pressurized fluid from the high or supply side of the valve into the low or return side thereof. For this purpose, the arcute edge portions of discs 43-46 are provided with seal plates 56, 57, which are secured to the discs as by bolts 58, 59, and between which an arcuate resilient seal 60, 61 is confined. Seals 60, 61 extend outwardly into engagement with housing side wall 22 and are disposed on the high or supply pressure side of the discs, that is, in communication with housing chamber 55. See FIGS. 3-6. Any tendency for leakage between the high and low pressure sides of valve 1 will tighten seals 60, 61 against housing side wall 22. Since ports 29-32 are disposed between planes 50 and 51, and do not overlap seals 60, 61, the seals fully engage side wall 22 at all times.

If desired, and as shown in the alternate embodiment of FIG. 11, similar seals 62 may be positioned along the outer longitudinal edges of partitions 52 and 53.

In the disclosed embodiment, diametrically opposed discs 44 and 46, and their respective diverter chambers II and IV, are of generally equal arcuate extent and size; while disc 45 and its respective chamber III is substantially smaller in arcuate extent and size than the diametrically opposed disc 43 and its respective chamber I. As shown, chambers II and IV each take up about ¼ of the circumference of housing 21, while chamber III takes up about ⅛ and chamber I takes up about ⅜ of the housing circumference. Thus, in the normal position of valve rotator assembly 42 shown in FIG. 3, chamber III does not register with any housing port while chamber I registers with two ports 29 and 31. Chambers II and IV each register with a single port 32 and 30 respectively. In the reverse position of assembly 42 shown in FIG. 4, each chamber I through IV registers with a single port 31, 32, 30 and 29 respectively.

Turning now to the normal flow operation of valve 1 as shown in FIGS. 3, 5, 7 and 8, in the normal position of valve rotator assembly 42, chamber I is in registry with both supply port 29 and downstream port 31, chamber II is in registry with downstream port 32, chamber III is out of registry with any port, and chamber IV registers with return port 30. High pressure supply fluid flows from source 15 through line 17 and hence enters valve 1 through supply port 29. From supply port 29, fluid flows into chamber I and fills it. Since chamber I is always in communication with diametrically opposite chamber III through the open chamber ends and housing chamber 55, chamber III will also be filled with supply fluid from supply port 29. However, since chamber III is not in registry with any port, it is essentially blocked. Therefore, fluid will be forced to flow directly across the inner face of disc 43 and essentially straight through to discharge from chamber I through downstream port 31 to heat exchanger 2.

The return fluid from heat exchanger 2 is at a lower pressure, due to the pressure drop therein, and flows through line 20 and hence enters valve 1 through downstream port 32. From port 32, fluid flows into chamber II and fills it. Since chamber II is always in communication with diametrically opposite chamber IV through the open chamber ends and housing chamber 54, fluid will flow into chamber IV and hence discharge through return port 30 and back to source 15. In this instance, fluid flows directly across the inner faces of discs 44 and 46.

When it is desired to reverse the flow of fluid through heat exchanger 2, piston 41 is actuated to rotate valve rotator assembly 42 by 45°, to the position shown in FIGS. 4, 9 and 10. In this reverse position of assembly 42, chamber I is in registry with port 31, chamber II is in registry with port 32, chamber III is in registry with port 30 and chamber IV is in registry with port 29. High pressure supply fluid again flows from source 15 through line 17 and hence enters valve 1 through supply port 29. From supply port 29, fluid flows into chamber IV and fills it, and hence into opposite chamber II through the chamber ends and housing chamber 54, and then discharges from chamber II through downstream port 32 to heat exchanger 2. In this instance, fluid flows directly across the inner faces of discs 44 and 46.

The return fluid, which is again at a lower pressure, flows through line 19 and enters valve 1 through downstream port 31, where it enters chamber I and fills it. Hence, the fluid flows into opposite chamber III through the chamber ends and housing chamber 55, and then discharges from chamber III through return port 30 and back to fluid source 15.

One of the advantages of the valve of the present invention is that side thrust on the bearings 35 and 37 and turning torque are minimized.

FIG. 12 schematically illustrates the present valve, with the four pie-shaped disc segments treated as a single planular circular disc 63 separating housing chambers 54 and 55. The supply pressure forces SP in housing chamber 55 are applied uniformly to the upper face of disc 63, while the return pressure forces RP are also applied uniformly to the lower face of the disc. Even though there is a pressure differential with forces SP being higher than forces RP, the uniform pressure distribution on each disc face, together with the fact that the forces at SP and RP act parallel to axis 34, eliminates any side thrust on bearings 35 and 37.

As to torque, this can be shown to be dependent on the areas of the various valve elements, namely the areas of the inner face of end walls 23 and 24 as well as the areas of the top and bottom faces of disc 63. In view of the fact that these areas are closely comparable, although not quite equal, the frictional force on the bearings 35 and 37 is negligible. Thus, the torque required to turn valve rotator assembly 42 is at a minimum.

This compares with a known plug-type valve as schematically illustrated in FIGS. 13 and 14, wherein a rotary shaft 64 is journalled in radial sleeve bearings 65, 66 and supports a tapered vane 67 for rotation about an axis 68. One face 69 of vane 67 is subject to high supply pressure SP and the opposite face 70 is subject to lower return pressure RP.

In the plug-type valve, it can be shown that the side thrust is directly proportional to the pressure differential (SP less RP) on opposite vane sides, which can of course be substantial when the downstream process device creates a large pressure drop. As to the torque, it is directly proportional to the product of the vane area, the supply pressure SP, and the distance L from axis 68 to the center of supply pressure force 71 on one side of vane 67 (somewhat similar to a center of gravity). Thus, the torque required to turn vane 67 can be quite substantial. This compares to the disc valve of FIG. 12 and of the present invention which is essentially free of side thrust and turning torque.

The valve of the present invention provides a unique system of reducing side thrust and turning torque in 4-way valves of the type that eliminate external piping. The valve can be easily manufactured such as by casting the working parts with little or no machining necessary. The pressure drop through the valve itself is very low.

If desired, valve 1 may be reversed in the fluid flow lines without departing from the spirit of the invention.

Various modes of carrying out the invention are contemplated as being within the scope of the following claims particularly pointing out and distinctly claiming the subject matter which is regarded as the invention.

I claim:

1. A fluid flow reversing diverter valve (1) for connection between a source of pressurized fluid (15) and a process device (2), comprising, in combination:
   (a) an enclosed housing (21) having a longitudinally extending generally cylindrical side wall (22) and end walls (23, 24),
   (b) a pair of spaced parallel upstream supply and return ports (29, 30) disposed in said housing side wall for connection to the fluid source,
   (c) a pair of spaced parallel downstream output and input ports (31, 32) disposed in said housing for connection to the process device, said downstream ports being in line with said upstream ports,
   (d) and a valve rotator assembly (42) disposed within said housing for rotation between a first and second position about a longitudinal axis (34) so that fluid entering said supply port (29) may be selectively directed to either of said downstream ports and so that fluid returning through either of said downstream ports is discharged through said return port (30), said assembly being connected to means to rotate the assembly within said housing and including:
   (1) axle means (33) mounted for rotation on said axis and fixed against axial movement,
   (2) a plurality of disc segments (43–46) disposed transversely of said axle means and extending radially outwardly therefrom, and with said disc segments having a pair of arcuately spaced generally radial edges (47, 48) and terminating in arcuate edges (49) disposed closely adjacent said housing side wall, said disc segments being disposed alternately adjacent opposite end portions of said axle means to form two pair (43, 45–44, 46) of arcuately spaced disc segments,
   (3) and longitudinally extending partitions (52, 53) joining said radial edges of alternate disc segments,
   (e) said assembly forming a plurality of rotatable alternating arcuate diverter chambers (I–IV) delineated by said housing side wall, said disc segments, and said partitions, and with the ends of said chambers opposite said disc segments being open.

2. The diverter valve of claim 1 wherein said disc segments separate said housing into a pair of separate housing chambers (54, 55) and with each housing chamber communicating with a pair of said diverter chambers.

3. The diverter valve of claim 1 wherein each said pair of arcuately spaced disc segments (43,45–44,46) together with their respective diverter chambers (I,III––II,IV) are generally diametrically opposed.

4. The diverter valve of claim 2 wherein:
   (a) each said pair of arcuately spaced disc segments (43,45–44,46) together with their respective diverter chambers (I,III–II,IV) are generally diametrically opposed,
   (b) and the respective diverter chambers partially delineated by each pair of said arcuately spaced disc segments are in communication with one of said pair of separate housing chambers.

5. The diverter valve of claim 1 or 5 wherein:
   (a) one pair of said generally diametrically opposed diverter chambers (II, IV) are of generally equal arcuate extent,
   (b) and the other pair of said generally diametrically opposed diverter chambers (I, III) are of unequal arcuate extent.

6. The diverter valve of claim 5 wherein:
   (a) each of said one pair of diverter chambers (II, IV) has an arcuate extent of about ¼ of the circumference of said housing side wall,
   (b) one of said other pair of diverter chambers (III) has an arcuate extent of about ⅛ of the circumference of said housing side wall,
   (c) and the other of said other pair of diverter chambers (I) has an arcuate extent of about ⅜ of the circumference of said housing side wall.

7. The diverter valve of claim 5 wherein:
   (a) in said first rotary position of said valve rotator assembly:
      (1) each of said one pair of diverter chambers (II, IV) registers with one of said housing ports (32, 30),
      (2) said one of said other pair of diverter chambers is out of registry with said housing ports and is blocked,
      (3) and said other of said other pair of diverter chambers registers with two of said housing ports (31, 29),
   (b) and in said second rotary position of said valve rotator assembly, each of said diverter chambers registers with one of said housing ports.

* * * * *

UNITED STATES PATENT AND TRADEMARK OFFICE
CERTIFICATE OF CORRECTION

PATENT NO. : 4,520,847
DATED : June 4, 1985
INVENTOR(S) : WALTER J. BARON

It is certified that error appears in the above-identified patent and that said Letters Patent is hereby corrected as shown below:

In the Abstract, line 13, delete "alternating" and insert --alternately--

In Column 4, line 33, delete "shaped" and insert --spaced--.

In Claim 5, column 8, line 1, delete "5" and insert --4--.

Signed and Sealed this

Thirteenth Day of August 1985

[SEAL]

Attest:

DONALD J. QUIGG

Attesting Officer  Acting Commissioner of Patents and Trademarks